Aug. 30, 1966 TOSHIO KURIMURA 3,270,272
RECTIFYING APPARATUS FOR PRODUCING CONSTANT VOLTAGE
Filed June 7, 1962 6 Sheets-Sheet 1

United States Patent Office 3,270,272
Patented August 30, 1966

3,270,272
RECTIFYING APPARATUS FOR PRODUCING CONSTANT VOLTAGE
Toshio Kurimura, Setagaya-ku, Tokyo, Japan, assignor to Kokusai Denshin Denwa Kabushiki Kaisha, Chiyoda-ku, Tokyo, Japan, a joint-stock company of Japan
Filed June 7, 1962, Ser. No. 200,880
Claims priority, application Japan, June 24, 1961, 36/21,980
6 Claims. (Cl. 321—32)

This invention relates to rectifying apparatuses for producing constant voltage. More particularly, the present invention relates to a new rectifying apparatus employing rectifiers with control electrodes the conductive periods of which are, in successive order, shifted directly and automatically in response to variations in the voltage of alternating current power source.

In general, the direct-current output voltage of a rectifying apparatus varies in accordance with the alternating current input voltage. Accordingly, in order to maintain the rectified output voltage at a very stable value, it has been common practice to stabilize the voltage of the input alternating current or, to stabilize the converted voltage of direct current by utilizing such a circuit as a vacuum tube type stabilizer which is controlled by the converted output voltage component. However, the apparatus of such prior art proposed heretofore have had numerous disadvantages, for example, slow response, complicated and high-cost construction, high power loss, and incapability of being applied to apparatus of high capacity.

It is an object of the present invention to solve the difficulties as stated above and to provide a new rectifying apparatus which is capable of producing an extremely stable, converted output voltage which is almost completely unaffected by variations in the voltage of the alternating-current power source.

It is another object of the invention to provide a rectifying apparatus for producing a constant voltage as stated above which, moreover, has a relatively simple construction and a simple and reliable operation.

It is still another object to provide a rectifying apparatus as stated above which has a wide range of applicability.

It is a further object to provide a rectifying apparatus as stated above which can be made in a compact or simple form.

Still further objects and advantages will presently become apparent from the description presented hereinafter.

The foregoing objects have been achieved by a rectifying apparatus, according to the present invention, for producing from an alternating-current supply a substantially constant direct-current voltage by utilizing grid controlled rectifiers or the like connected to the load through at least one choke coil, wherein said controlled rectifiers are, successively, rendered conductive at every instant when a respective voltage, which is proportional to and delayed by $\pi/2$ in phase against a respective difference voltage between every two alternating voltages between which the rectified current is commutated, coincides with a direct-current reference voltage.

The above-described rectifying apparatus for producing a constant voltage which is provided by the present invention is one wherein the direct-current output voltage is maintained substantially constant, even when variations exist in the voltage of the power source, and stable operation in a simple, yet positive manner is obtained.

The rectifying apparatus for producing constant voltage according to this invention is not of the so-called feedback type which has been principally used heretofore, and which accomplishes control of rectifiers with control electrodes by detecting the variations in the direct-current output voltage and utilizing this detected voltage. In the rectifying apparatus according to this invention, rectification is accomplished so that variations of the alternating-current voltage are directly without employing a feedback loop and automatically corrected, wherefore the apparatus is of a type which may well be called a "direct control type." Accordingly, this apparatus has highly desirable characteristics, extremely high sensitivity, and, moreover, almost no offset.

The nature and details of this invention, as well as the manner in which its objects and numerous advantages may best be achieved, will be more clearly apparent by reference to the following detailed description of a few representative embodiments of the invention, taken in conjunction with the accompanying drawings in which the same and equivalent parts are designated by the same reference numerals and letters, and in which.

Figure 1:
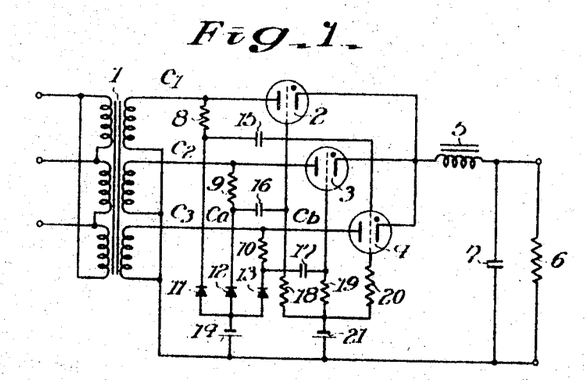
FIG. 1 is an electrical diagram, showing an embodiment of the invention in an application to half-wave rectification of a three-phase, alternating current, in which a power transformer of star connection type is used.

Referring to FIG. 1 which is a case of an application of the rectifying apparatus according to the invention to half-wave rectification of a three-phase alternating current, and which will first be described. A three-phase transformer 1 with its secondary windings connected in a star configuration supplies alternating currents to rectifiers with control electrodes 2, 3, and 4, the outputs of which are commonly supplied, through a choke coil 5, to a load 6. A smoothing capacitor 7 is connected in parallel with the load 6.

On the other hand, in order to generate the control voltage of each of the rectifiers with the control electrodes 2, 3, and 4 resistances 8, 9, and 10 for limiting currents are connected to the output terminals of the three phases of the transformer, and the other ends of these resistances are connected, by way of rectifying elements 11, 12, and 13, respectively, to a reference-voltage source 14. The voltages at the respective junctions between these resistances 8, 9, and 10 and these rectifying elements 11, 12, and 13 are applied by way of differentiating capacitors 15, 16, and 17, respectively, to the control electrodes of the corresponding rectifiers with control electrodes 4, 2, and 3. Resistances 18, 19, and 20 which are connected to these electrodes form, together with differentiating capacitors 15, 16, and 17, respective differentiation circuits.

A power source 21 which is connected to the other ends of the resistances 18, 19 and 20 applies optimum bias voltage to the rectifiers with control electrodes and, normally, maintains these rectifiers in their cut-off states.

Figure 2A:
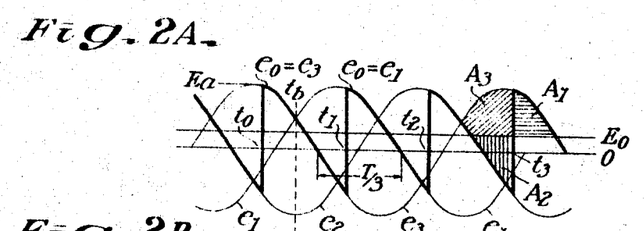
FIGS. 2A, 2B, and 2C are waveform diagrams of describing the operation of the embodiment shown in FIG. 1.

The operation of the above-described rectifying apparatus is described below with refernce to FIGS. 2A, 2B, and 2C. In FIG. 2A, the heavy solid lines represent the input voltage $e_0$ of the choke coil 5. As indicated by the heavy lines, in this rectifying apparatus, the voltage $e_1$ of the first phase, the voltage $e_2$ of the second phase, and the voltage $e_3$ of the third phase are so controlled that they are rendered conductive by starting the rectifiers with control electrodes 2, 3, and 4, in sequence, to become equal to the input voltage $e_0$ of the choke coil 5. That is, in the period from $t_0$ to $t_1$, the rectifier with control electrode 4 is conductive, whereby the voltage $e_0$ is substantially equal to the voltage $e_3$ of the third phase. In the same manner, in the period from $t_1$ to $t_2$, the voltage $e_0$ is substantially equal to the voltage $e_1$, and in the period from $t_2$ to $t_3$, the voltage $e_0$ is substantially equal to the voltage $o_2$.

Figure 2B:
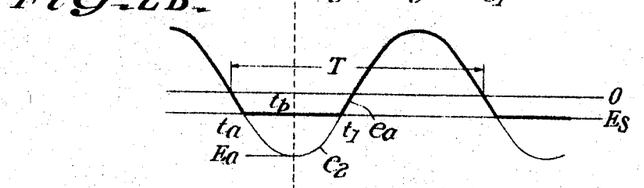

In order to successively render the rectifiers with control electrodes conductive an impulse having a waveform as indicated by the heavy line in FIG. 2B is generated at the junctions between the respective resistances 8, 9 and 10 and rectifying elements 11, 12 and 13, in the regulation connection which comprises resistances 8, 9 and 10, the rectifying elements 11, 12 and 13, and the reference voltage source 14. In FIG. 2B, however, especially for convenience in description, only the waveform obtained from the voltage $e_2$ of the second phase by the use of the resistance 9, the rectifying element 12, and the reference-voltage source 14 is indicated in relation to FIG. 2A.

Figure 2C:
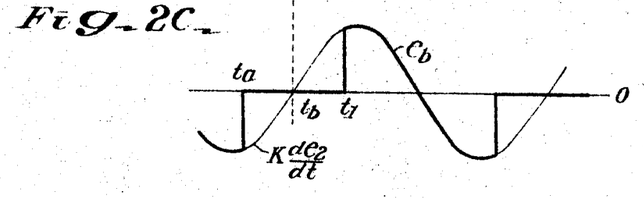

Referring to FIGS. 2A, 2B, and 2C, the case wherein the rectifier with control electrode 2 is conductive will now be considered. The symbol $e_a$ designates the voltage produced at the junction between the resistance 9 and the rectifying element 12. In the interval from $t_a$ to $t_1$, since the second-phase voltage $e_2$ exceeds the voltage $E_s$ of the reference power source 14, the rectifying element 12 becomes conductive, whereby the state $e_a = E_s$ is maintained. This voltage $e_a$ is differentiated by the differentiation circuit composed of the condenser 16 and the resistor 18. Accordingly, a voltage $e_b$ as indicated by the heavy line in FIG. 2C is obtained at the control electrode terminal of the rectifier with control electrode 2. Since the voltage $e_a$ is constant in the interval $t_a$ to $t_1$, the voltage $e_b$ is zero; but at the time $t_1$, it rises abruptly to a value corresponding to the differentiated value of the voltage $e_a$. This abrupt rise of the voltage $e_b$ at $t_1$ is utilized to fire or start the rectifier with control electrode 2.

At the time $t_1$ when the rectifier 2 is conductive, the input voltage $e_3$ applied to the anode terminal of the rectifier with control electrode 4 is, as indicated in FIG. 2A, lower than the input voltage $e_0$ of the choke coil 5 (this voltage $e_0$ corresponding to the voltage applied on the cathode of the rectifier with control electrode 4). Consequently, the rectifier with control electrode 4 is cut off.

As described above, a control signal obtained from the voltage $e_2$ is used for igniting the rectifier with control electrode 2, while, in the same manner, control signals obtained from voltages $e_3$ and $e_1$ are used for igniting the rectifiers with control electrodes 3 and 4, respectively. As described in the foregoing disclosure, the switching of the conductive states of the three rectifiers with control electrodes 2, 3 and 4 is accomplished with phase difference of $$\frac{2\pi}{3}(T/3)$$

which is the same as the phase difference between the phases of the input alternating current.

If the rectifiers with control electrodes 2, 3 and 4 and the transformer 1 are connected in the reverse polarities to those of the case illustrated in FIG. 1, and, moreover, the reference voltage source 14 is connected in the reverse polarity to the illustrated, the output voltage $E_0$ will be obtained, at the output side of the choke coil 5, at a lower potential than the common return terminal which is sometimes used as the ground terminal. While, in the description presented hereinafter, only the case wherein a voltage of positive (+) polarity is obtained will be illustrated, it will be apparent that it is possible to obtain a voltage of negative (−) polarity by making necessary changes therein.

The reason why the output voltage $E_0$ is stably maintained at a constant value by the above-described operation, without being influenced by variations in the input alternating-current voltage, will now be analyzed in connection with FIG. 2A. If the capacitance of the smoothing capacitor 7 of the output side is assumed to be sufficiently large, and the ripple component and the resistance component of the choke coil 5 are assumed to be negligible, the output voltage $E_0$, in FIG. 2A, will assume a value corresponding to the mean value of the input voltage $e_0$ of the choke coil 5. That is, the output voltage $E_0$ will assume such a value that, in FIG. 2A, the area between the curve $e_0$ and the line $E_0$ included in the portion wherein the voltage $e_0$ is greater than the voltage $j E_0$ (that is, the area $A_1$ with horizontal hatching) is equal to the area between the curve $e_0$ and the line $E_0$ included in the portion wherein $e_0$ is less than the voltage $E_0$ (that is, the area $A_2$ with vertical hatching). Accordingly, if the area of the portion with diagonal hatching, as shown in FIG. 2A, is designated by the symbol $A_3$, the following equation will be valid.

$$A_1 + A_3 = A_2 + A_3 \qquad (1)$$

The righthand side of the above equation corresponds to an area produced by integrating the voltage difference between adjacent phases (line voltage) in the period from the time when the difference is zero (for example: $t_b$) to the time when switching of conductive states of the rectifiers with control electrodes takes place (for example: $t_1$). In the case of switching from $e_3$ to $e_1$ in FIG. 2A, if the time when $e_3$ and $e_1$ intersect is denoted by $t_b$, the portion corresponding to $(A_2+A_3)$ may be represented by the following equation.

$$A_2 + A_3 = \int_{t_b}^{t_1}(e_1 - e_3)dt \qquad (2)$$

Since the input is a three-phase alternating current, the variable $(e_1 - e_3)$ also assumes a sinusoidal wave, and its maximum amplitude is $\sqrt{3}E_a$, where $E_a$ is the maximum amplitude of $e_1$, $e_2$, and $e_3$. Accordingly, Equation 2 may be rewritten as follows:

$$A_2 + A_3 = \frac{\sqrt{3}T}{2\pi}E_a(1 - \cos\theta) \qquad (3)$$

where: $\theta = 2\pi[(t_1 - t_b)/T]$; and
T is the period of the alternating-current voltage.

On the other hand, when the lefthand side of Equation 1 is now considered, this quantity $(A_1 + A_3)$ is obtained by subtracting the area enclosed between the zero line and the line corresponding to $E_0$ from one half of the area produced by integrating the line voltage over its half period (this line voltage relates to $e_2$ and $e_3$ in the case of FIG. 2A). That is, $$A_1 + A_3 = \frac{\sqrt{3}E_a T}{2\pi} - E_0 \cdot \frac{T}{3} = \sqrt{3}E_a\left(1 - \frac{2\pi}{3\sqrt{3}}\cdot\frac{E_0}{E_a}\right)\frac{T}{2\pi} \qquad (4)$$

From Equations 3, 4, and 1, the following relation is obtained.

$$\cos\theta = \frac{2\pi}{3\sqrt{3}}\cdot\frac{E_0}{E_a} \qquad (5)$$

On the other hand, as may be seen from FIG. 2B, the voltage $e_2$ is in the form of a cosine wave with its maximum negative value at the time $t_b$. Therefore, $$\cos\theta = E_s/E_a \qquad (6)$$

Accordingly, the following relation is obtained from Equations 5 and 6.

$$E_o = \frac{3\sqrt{3}}{2\pi} \cdot E_s \qquad (7)$$

That is, the aforedescribed rectifying apparatus provides an output voltage $E_0$ which is expressed by Equation 7. Since this relation is independent of voltage of the alternating-current power source, the rectified output of this rectifying apparatus is constant even when voltage of the alternating-current power source varies, and the apparatus operates as a rectifying apparatus for producing a constant voltage.

Figure 3A:
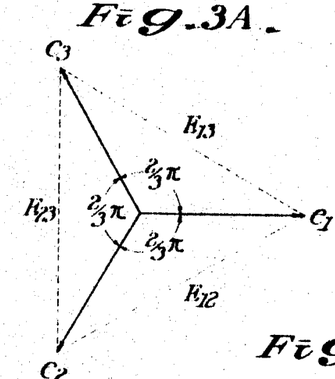
FIGS. 3A, 3B, and 3C are vector diagrams indicating the phase relationships of control voltages to be used for rectifying a three-phase, alternating current.

The method of producing signals for controlling the rectifiers with control electrodes in the case of rectification of three-phase alternating current as described above may be further described with reference to vector diagrams as shown in FIGS. 3A, 3B, and 3C. In the case of a star connection, the voltages $e_1$, $e_2$, and $e_3$ have a displacement of $2\pi/3$ as indicated in FIG. 3A. The symbols $E_{12}$, $E_{23}$, and $E_{13}$ designate respectively difference voltages. As previously described, when switching from $e_3$ to $e_1$ is performed, a voltage corresponding to the integrated value of the difference voltage $E_{13}$ between the phase voltage $e_3$ which is conductive and the phase voltage $e_1$ which is successively conductive may be considered to be used in order to make it refer to the reference voltage. (In the example of FIG. 2, the abovesaid difference voltage is represented by the light line waveform shown in FIG. 2C, and the waveform corresponding to the integrated value of this difference voltage is that shown in FIG. 2B). In the example of difference voltage $E_{13}$, since the voltage $e_2$ having a phase difference of $\pi/2$ with respect to $E_{13}$ corresponds to the present voltage, the voltage $e_2$ is adopted as a voltage for generating the control signal in this case. Even if the amplitude of the present voltage is not equal to that of $e_2$, if their phases are the same, this voltage may, of course, be used similarly as a control voltage by selecting suitably the value of the reference voltage $E_s$ in accordance with this voltage. Similarly, when commutation from $e_1$ to $e_2$ is performed, the voltage $e_3$ having a phase difference of $\pi/2$ with respect to the difference voltage $E_{12}$ is used as a voltage for the purpose of generating a signal for switching; and when switching from $e_2$ to $e_3$ is performed, the voltage $e_1$ having a phase difference of $\pi/2$ with respect to the difference voltage $E_{23}$ is used as a voltage for the purpose of generating a signal for switching as shown in FIG. 1.

Figure 3B:
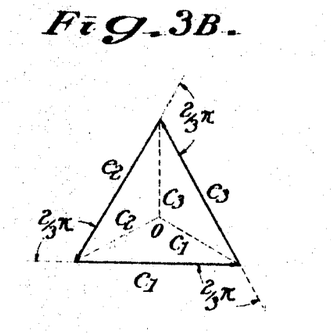

In the case wherein the connection of the transformer is a ring connection, and a voltage having a phase difference of $\pi/2$ with respect to the difference voltage as in the previous case is not directly obtainable from the voltage of the alternating-current power source, voltages such as $c_1$, $c_2$ and $c_3$ can be generated by the system indicated in FIG. 3B and used as voltages for the purpose of generating signals for switching.

Figure 3C:
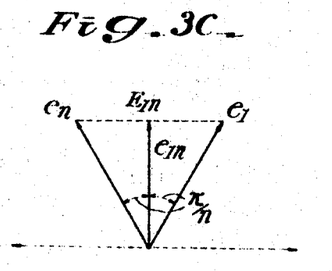

Systems for generating control signals through the utilization of the phase relationships of the various phase voltages have been described above. In general, in the case of polyphase (n-phase) alternating current as, for example, shown in FIG. 3C, wherein a signal having a phase difference of $\pi/2$ with respect to a line voltage $E_{n1}$ cannot be obtained by the above-described system, it is possible to produce a control voltage $e_{1n}$ having, in equivalent effect, a phase difference of $\pi/2$ with respect to the difference voltage $E_{1n}$ by shifting a phase voltage which is conductive (for example; $e_n$) or a phase voltage which becomes successively in conductive state (for example; $e_1$) by the quantity $\pi/n$ from $e_n$ or $e_1$.

Figure 4:
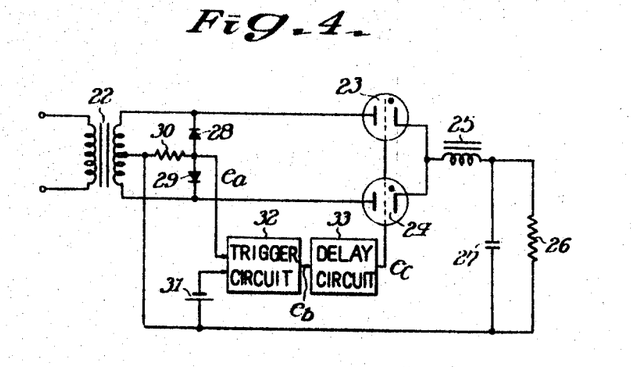
FIG. 4 is an electrical connection diagram showing another embodiment of the invention in an application to the rectification of two-phase alternating current (this term being used herein to distinguish it from the full-wave rectification of single-phase, alternating current)

FIG. 4 illustrates another embodiment of this invention in which application thereof is made to the rectification of a two-phase alternating current. FIG. 5 shows waveforms indicating the operation of the embodiment of FIG. 4 as described below.

Figure 5A:
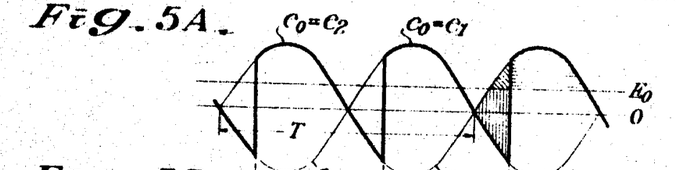
FIGS. 5A, 5B, 5C, and 5D are graphical representations showing waveforms for describing the operation of the embodiment shown in FIG. 4.
Figures 5B, 5C, 5D:
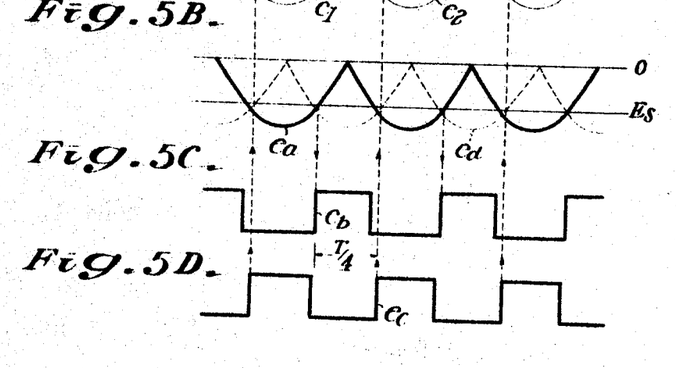

By means of rectifying elements 28 and 29, a voltage $e_a$ corresponding to a difference voltage as indicated by the heavy line in FIG. 5B is produced at a resistance 30, and this voltage $e_a$, together with the voltage $E_s$ of a reference voltage supply 31, is applied to a trigger circuit 32. Then, a rectangular pulse wave $e_b$ having transition instants corresponding to the instants when the voltage $e_a$ coincides with the reference voltage $E_s$ in the direction in which it becomes zero, is generated as indicated in FIG. 5C. This voltage $e_b$ (or its differentiated signal) is passed through a delay circuit 33 having a retardation time of $T/4$ and becomes a control voltage $e_c$ (FIG. 5D) having a phase difference corresponding to $T/4$ of the voltage of the alternating-current power source with respect to the voltage $e_b$. This control voltage $e_c$, when it is regarded from a different viewpoint, may be considered as a rectangular wave having transition instants corresponding to the every instant when a voltage $e_d$ having a phase difference of $\pi/2$ with respect to the line voltage $e_a$ (that is, the signal $e_d$ shown by broken line in FIG. 5B) coincides with the reference voltage $E_a$. Although this control voltage $e_c$ is applied common to both of the control electrodes of the rectifiers with control electrodes 23 and 24, only the rectifier with control electrode which has an anode voltage higher than its cathode voltage becomes conductive at their respective transition instants.

Accordingly, as the input voltage $e_0$ of the choke coil 25, the voltage indicated by the heavy line in FIG. 5A is obtained. Since, for the delay circuit 33, a circuit having a delay time corresponding to $T/4$ can be used, an active circuit such as a monostable multivibrator may be used for this circuit.

In the two embodiments described above in connection with FIGS. 1 and 4, two methods of generating control voltage of the rectifiers with control electrodes were described. Furthermore, in conjunction with FIGS. 3A, 3B, and 3C, the description has been presented from the viewpoint of phase position. To facilitate a clearer understanding of the system for generating the said control signals, a summary description to be taken in conjunction with FIGS. 6A, 6B, and 6C is presented below.

Figure 6A:
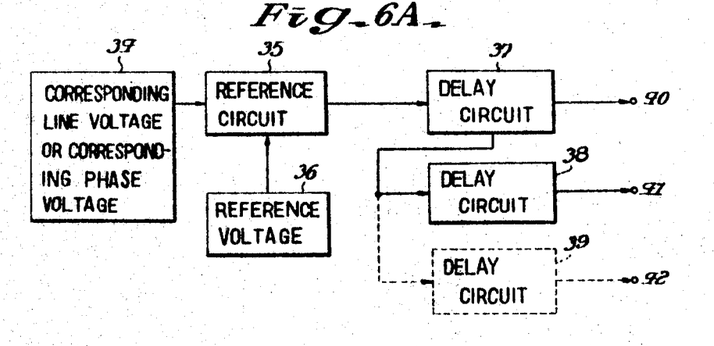
FIGS. 6A, 6B, and 6C are block diagrams for describing the manner of production of control voltages of rectifiers with control electrodes.

In the case indicated in FIG. 6A, the line voltage 34 between the phase which is in now a conductive state and the phase which is next to become conductive is, in a reference circuit 35, first referred to a reference voltage 36, and then the output signal of this reference circuit 35 is phase shifted in a delay circuit 37 having a delay time corresponding to $T/4$ of the voltage of the alternating-current source, whereby one control signal is obtained at the output terminal 40 of the delay circuit 37. The control signals used for successively switching the other phases are obtained at the outputs 41, 42, ... of the delay circuits 38, 39, ... and the delay time of these delay circuits 38, 39, ... are integral number multiples of the quantity ($2\pi$/number of phases). The input of the delay circuit 39 can be taken from the output terminal of the delay circuit 38 or the reference circuit 35.

Figure 6B:
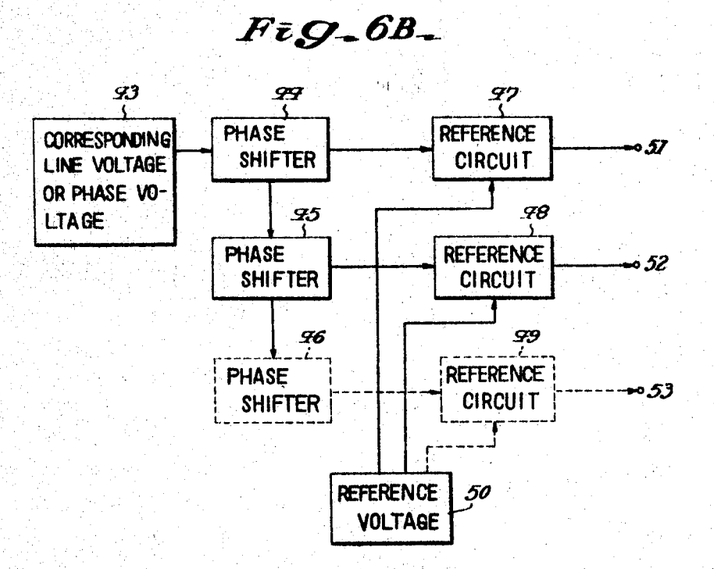

Next, in the system illustrated in FIG. 6B, the control signals are obtained by establishing reference with the respective reference voltages after effectuation of the necessary phase shift. As in the case of FIG. 6A, it is possible to derive the input signal of the phase shifter 46 from the output of the phase shifter 44.

Figure 6C:
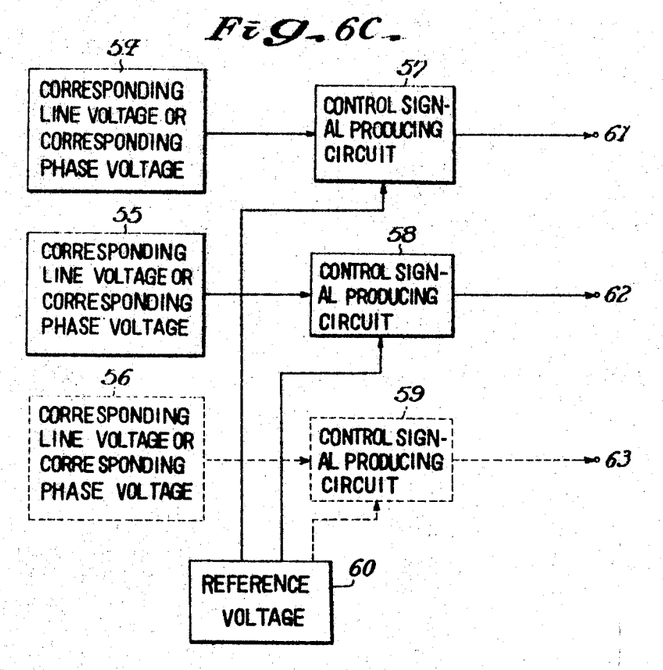

The system employed in the case, indicated in FIG. 6C, differing from that in the case of FIG. 6A or 6B in which one difference voltage or one phase voltage is utilized, utilizes each of the corresponding difference voltages or phase voltages. The control signal producing circuits 57, 58, 59, ... are each provided with means for establishing a reference with respect to the reference voltage 60 and means for effecting a necessary phase shift after correction of the waveform or conversion to pulse signal in case of necessity. In the case of FIG. 6A, a combination of the reference circuit 35 and the delay circuit 37 corresponds to these control signal producing circuits. In terms of the embodiment of FIG. 4, a combination of the trigger circuit 32 and the delay circuit 33 corresponds to these control signal producing circuits.

Furthermore, while the above description has related exclusively to cases in each of which the original signal for producing a control signal is derived directly from the main power transformer, it is also possible to derive this original signal by using an auxiliary transformer provided as an attachment to the main power transformer. In this case, it is possible to adopt the most simple, reliable, but still stable control circuits without any limitations being imposed by the connection system of the windings of the main transformer.

For example, in the case of a single phase, it is possible to convert a single-phase to two-phases; or in the case of ring connection, the ring connection can be converted to a star connection.

Finally, in order to disclose the rectifying apparatus according to the present invention still more, the following embodiments thereof are described.

Figure 7:
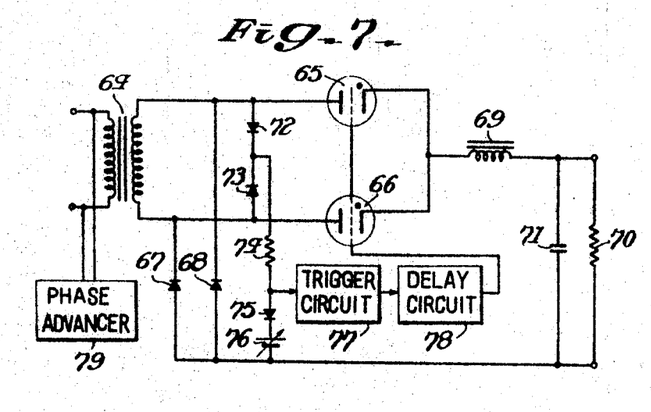
FIG. 7 is an electrical connection diagram showing an embodiment of the invention in the case of its application to full-wave rectification of single-phase, alternating current.

In FIG. 7 is illustrated an embodiment in the case of the application of the invention to full-wave rectification of a single, phase alternating, current. The control system of this embodiment differs from the case of rectification of a two-phase alternating current described in connection with FIG. 4 in that a neutral point cannot be utilized.

Figure 8:
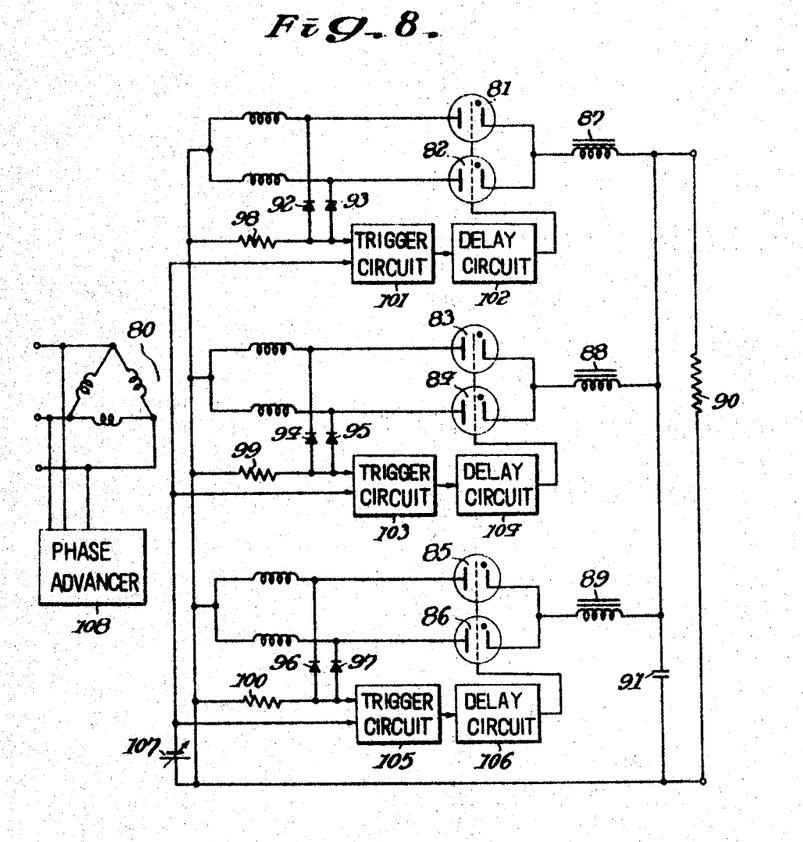
FIG. 8 is an electrical connection diagram showing an embodiment of the invention in the case of its application to rectification of six-phase, alternating current.

One embodiment of the invention in the case of its application to rectification of a six-phase alternating current is shown in FIG. 8. This embodiment may be understood to be of a device wherein three circuits, each of which is that of the rectification of two-phase alternating current shown in FIG. 4, are provided in parallel arrangement.

Figure 9:
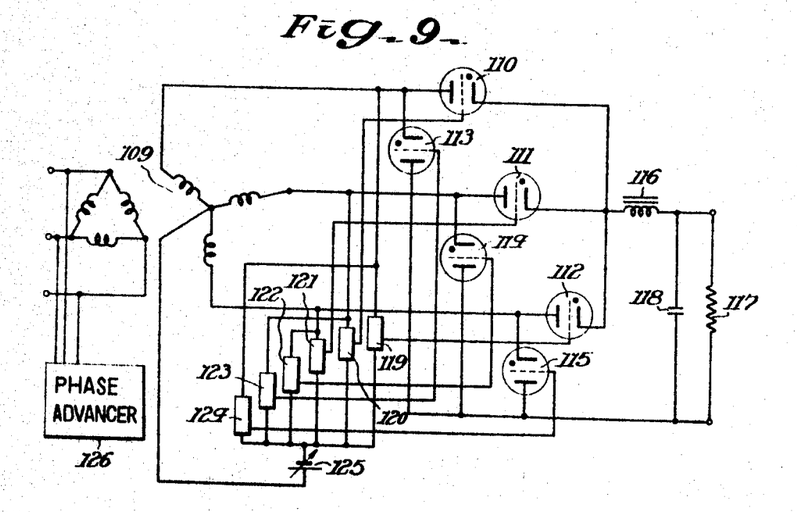
FIG. 9 is an electrical connection diagram showing an embodiment of the invention in an application to full-wave rectification of three-phase alternating current.

FIG. 9 illustrates another embodiment of the invention in the case of its application to full-wave rectification of three-phase alternating current. This embodiment is the same as that of the case shown in FIG. 1 except that the number of the rectifiers with control electrodes and the number of control signal producing circuits (these may be supposed to be the same as those previously described, or, in this embodiment, it may be considered that a control signal producing circuit 112 indicates the combination of the resistance 8, rectifying element 11, and capacitor 15 of FIG. 1) are doubled as compared with the case of FIG. 1. In operation also, the number of switching of conductive state is double that in the case illustrated in FIG. 1. That is, control signals of the rectifiers belonging to the first group (110, 111 and 112) are the same as those of the rectifiers 2, 3, and 4 in FIG. 1. However, phases of the control signals of the rectifiers belonging to the second group (113, 114, and 115) are made to differ, respectively, from those of the control signals for said first group in order to accomplish the full-wave rectification of three-phase alternating current. With this difference in mind, the operation of the embodiment of FIG. 9 will be easily understood by analogy with that of the embodiment shown in FIG. 1. The circuit diagram of FIG. 9 is shown without any bias circuit for the sake of simplicity in illustration.

If, in each of the above-described embodiments, the reference voltage is adapted to be variable, it will be possible to set the output voltage $E_o$ correctly and accurately to a desired voltage within a predetermined range. (Shown in only FIGS. 7, 8, and 9.)

In this type of rectifying apparatus, in general, the phase position of the current of any phase lags with respect to its phase position of voltage, and the power factor thereof drops. If necessary, however, the power factor of the rectifying apparatus can be improved by connecting a phase-advancing capacitor or a phase-advancing synchronous machine to the primary side or the secondary side of the main power transformer. Furthermore, since the above-mentioned phase lag has the characteristic of varying in accordance with the variation of the voltage of the alternating-current power source, it is also possible to maintain the power factor always at a desirable value by controlling the current of the aforementioned phase advancer by means of the power source voltage. (The case wherein a phase advancer is applied to the primary side is indicated in only FIGS. 7, 8, and 9.)

In the aforesaid description, it is assumed that each of said choke coils is connected to the rectifiers with control electrodes and the output voltage or current is obtained through the choke coils. However, as will be understood by analogy with the conventional technique of these rectifying apparatuses, each of the choke coils can be connected to either of the output terminals of plus or minus potential except the embodiment of FIG. 8.

As described in the foregoing disclosure, in the rectifying apparatus for producing a constant voltage according to the present invention, since a control system in which rectifiers, themselves, are directly and automatically controlled in response to variations in the voltage of alternating-current power source is used, no limitations are imposed on the capacity of the said rectifying apparatus against the case of rectifying apparatus of feed-back type for producing constant voltage in which such components as vacuum tubes are used. Accordingly, the present invention can be readily applied also to rectifying apparatus for power sources of high capacity. Moreover, this advantage affords compact construction whereby rectifying apparatus of unconventionally small size can be provided.

Furthermore, since in the rectifying apparatus according to the present invention, sensitivity and reliable control are obtainable, the present invention is applicable to a wide range of power source apparatus.

Although this invention has been described with respect to a few particular embodiments thereof, it is not to be so limited as changes and modifications may be made therein which are within the full intended scope of the invention, as defined by the appended claims.

What I claim is:

1. A rectifying apparatus for producing a substantially constant direct-current voltage, comprising an alternating-current supply source connected in a three-phase star configuration and having terminals, three controlled rectifiers respectively connected in the same sense to said terminals of said source, ignition means comprising three resistors, three rectifier elements, three capacitors and a reference direct-current source, said resistors being respectively connected to said alternating current source and connected in common to said reference direct-current source respectively through said rectifier elements, connections connecting said reference direct-current source to a neutral point of said alternating current source, ignition signals for each controlled rectifier from said capacitors and a connection junction between a resistance and a rectifying element connected to a respective phase terminal of said alternating current source, whereby in operation said controlled rectifiers are successively rendered conductive in operation to supply rectified current to a load, and a choke coil connected to receive said rectified current and connections to apply the rectified current from said choke coil to said load.

2. A rectifying apparatus for producing a substantially constant direct-current voltage comprising, an alternating-current supply source having a three two-phase star configuration having terminals, two-phase rectifying circuit means comprising two controlled and two uncontrolled rectifiers each connected to each other at the output side thereof in a full-wave rectification bridge circuit configuration connected to corresponding two-phase terminals of said alternating current source, difference voltage means comprising two auxiliary rectifiers connected in series back-to-back to each other and connected to said source to obtain from said two auxiliary rectifiers and said uncontrolled rectifiers a difference voltage between terminals of said source, means to develop in operation a direct-current reference voltage, ignition means for generating ignition signals at every instant when said difference voltage coincides with said direct-current reference voltage and for shifting, by a quarter period of the alternating-current of said source said ignition signals, connections for applying said ignition signals in a shifted condition to control said two controlled rectfiers, whereby said two controlled rectifiers are alternately rendered conductive to supply the rectified current to a load, and a choke coil connected to receive the rectified current and apply it to said load.

3. A rectifying apparatus for producing from an alternating-current supply source a substantially constant direct-current voltage comprising, a plurality of controlled rectifiers each connected in operation to said alternating-current supply source, means to develop in operation a direct-current reference voltage, difference voltage means for deriving from said alternating-current supply source at least one voltage proportional to and delayed by $\pi/2$ in phase with respect to difference voltages between every two alternating voltages between which the rectified current is commutated, ignition means for generating ignition signals at every instant when any voltage derived coincides with said direct current reference voltage and for applying said signals to said rectifiers, whereby said controlled rectifiers are successively rendered conductive to supply rectified current to a load, at least one choke coil for receiving the rectified current, and connections from said choke coil for connecting a load thereto for receiving said rectified current therefrom.

4. A rectifying apparatus for producing a substantially constant direct-current voltage, comprising an alternating-current supply source having a center connection and terminals, two controlled rectifiers respectively connected in the same sense to the terminals of said source, difference voltage means connected to said center connection comprising two diode rectifiers connected in series back-to-back to each other and connected to said terminals of the source to obtain from said two rectifiers and the source a difference voltage, a direct-current reference voltage source connected to said center connection and a load, ignition means connected to said reference voltage source and the junction of said diode rectifiers for shifting by a quarter period of the alternating-current of said source said difference voltage and for generating ignition signals at energy instants when said difference voltage in a shifted condition coincides with said direct-current reference voltage source and applying said ignition signals to control said controlled rectifiers, whereby said controlled rectifiers are alternately rendered conductive to supply the rectified current to a load, a choke coil connected to receive the rectified current, and connections from said choke coil for connecting the load thereto for receiving said rectified current therefrom.

5. A rectifying apparatus for producing a substantially constant direct-current voltage, comprising an alternating-current single-phase supply source, two controlled and two uncontrolled rectifiers each connected to one another in a full-wave rectification bridge circuit configuration connected to said source, means to develop in operation a direct-current reference voltage, difference voltage means comprising two auxiliary rectifiers connected in series back-to-back to each other and connected to terminals of said source to obtain from said two auxiliary rectifiers and said uncontrolled rectifiers a difference voltage between terminals of said source, ignition means for shifting by a quarter period of the alternating-current of said source said difference voltage and for generating ignition signals at every instant when the shifted difference voltage coincides with said direct-current reference voltage, connections for applying said ignition signals to control the two controlled rectifiers, whereby said controlled rectifiers are alternately rendered conductive to supply rectified current to a load, a choke coil connected to receive said rectified current for application to said load therethrough.

6. A rectifying apparatus for producing a substantially constant direct-current voltage from an alternating-current supply source having a three-phase star configuration comprising, two-phase rectifying circuits each comprising two controlled and two uncontrolled rectifiers each connected to one another in a full-wave rectification bridge circuit connected to corresponding two-phase terminals of said source, means to develop in operation a direct-current reference voltage, difference voltage means comprising two auxiliary rectifiers connected in series back-to-back to each other and connected to said source to obtain from said two auxiliary rectifiers and said uncontrolled rectifiers a difference voltage between terminals of said source, ignition means for shifting by a quarter period of the alternating-current of the source said difference voltage and for generating ignition signals at every instant when the shifted difference voltage coincides with said direct-current reference voltage, connections for applying said ignition signals to control said two controlled rectifiers, whereby said controlled rectifiers are alternately rendered conductive to supply rectified current to a load, and a choke coil connected to receive the rectified current and apply it to said load therethrough.

References Cited by the Examiner
UNITED STATES PATENTS

| | | | |
|---|---|---|---|
| 2,103,997 | 12/1937 | Bedford | 321—40 X |
| 2,239,289 | 4/1941 | Goodhue et al. | 321—16 X |
| 2,539,786 | 1/1951 | Lissman | 321—40 |
| 2,640,959 | 6/1953 | Brown | 321—18 |
| 2,673,952 | 3/1954 | Hoover | 315—146 X |
| 2,688,721 | 9/1954 | Bixby | 321—18 |
| 2,728,886 | 12/1955 | Rohats | 321—8 |
| 2,859,399 | 11/1958 | Sommeria | 321—38 |
| 3,109,976 | 11/1963 | Sichling | 321—4 |
| 3,116,446 | 12/1963 | Healey | 321—18 |
| 3,134,068 | 5/1964 | Feltman | 321—18 |

JOHN F. COUCH, *Primary Examiner.*

A. J. GAJARSA, W. E. RAY, *Assistant Examiners.*

LLOYD McCOLLUM, *Examiner.*